Inventor

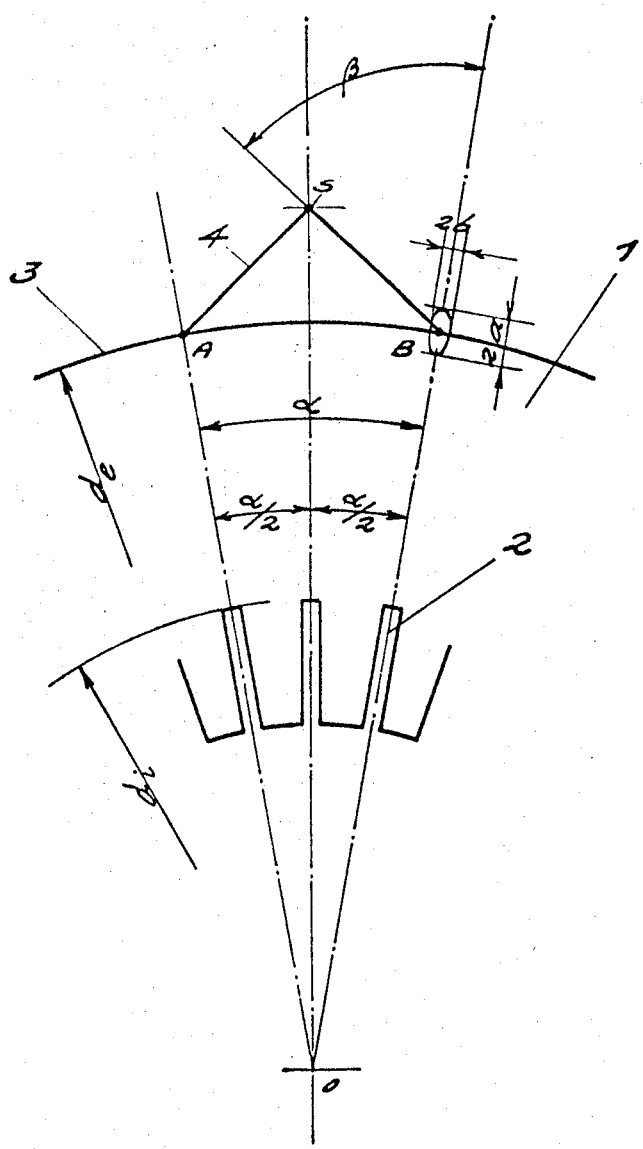

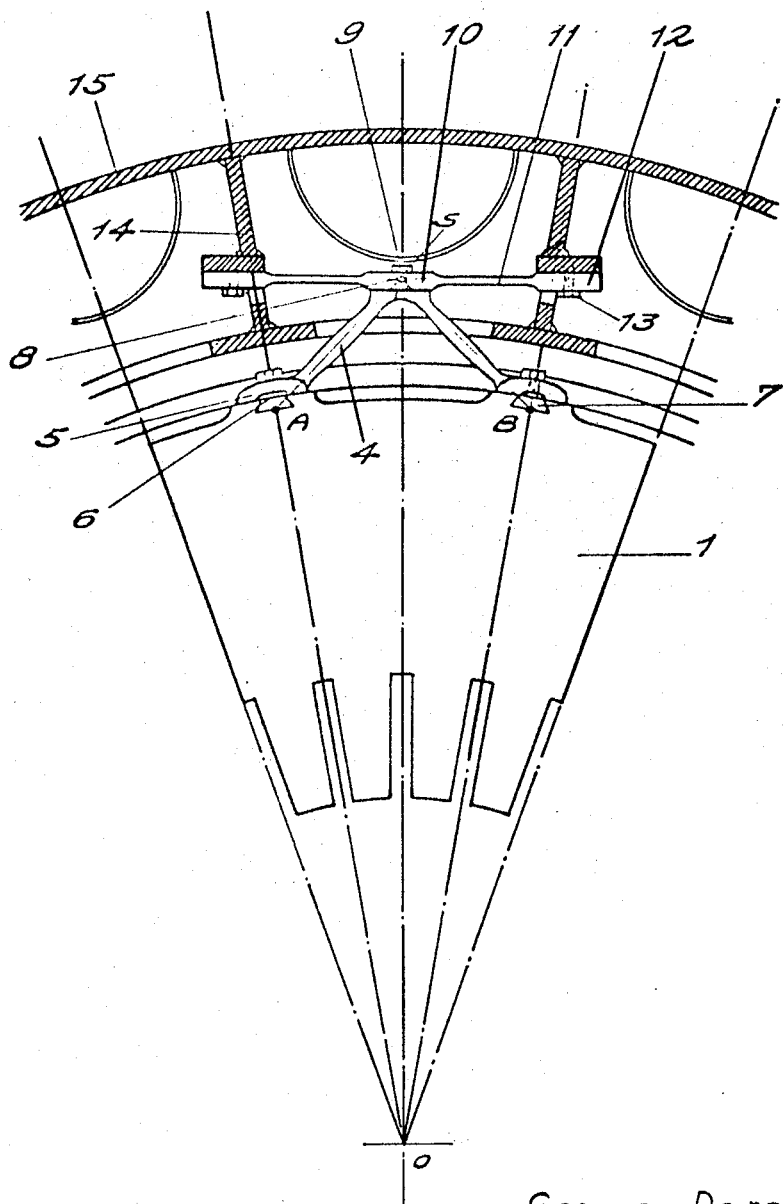

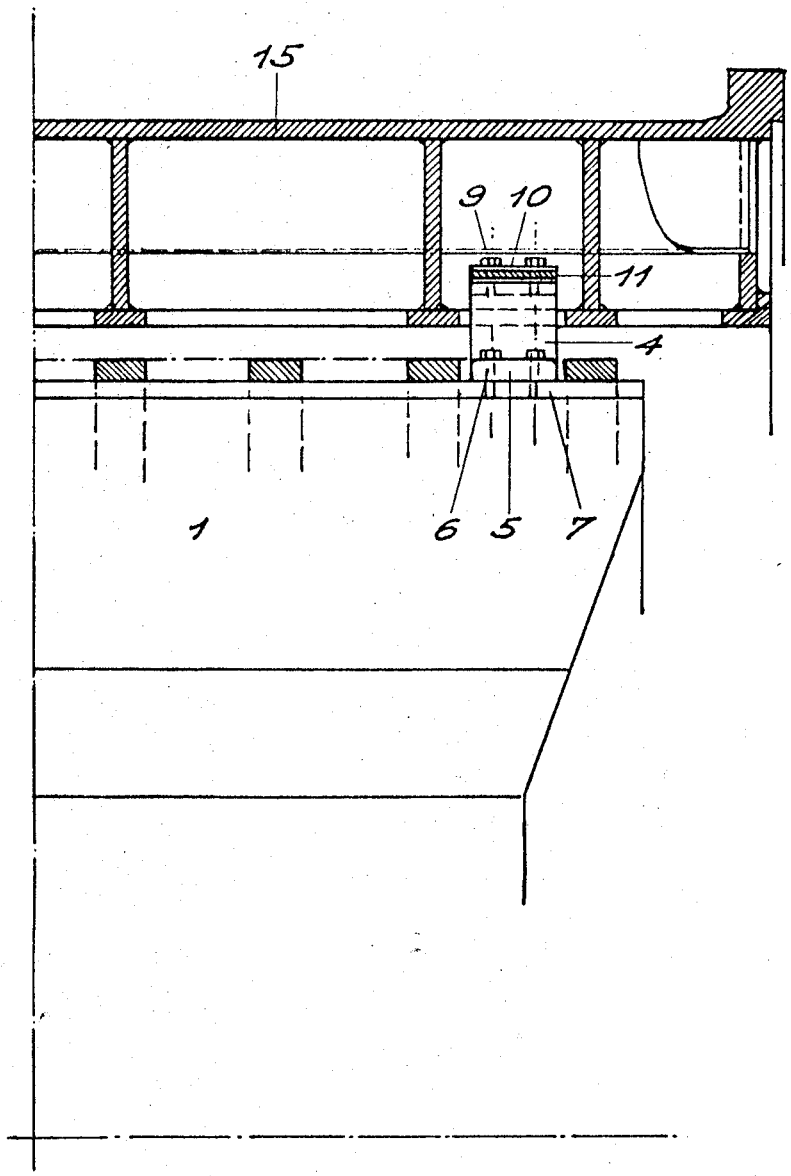

Georges Darrieus

By Pierce, Scheffler & Parker
Attorneys

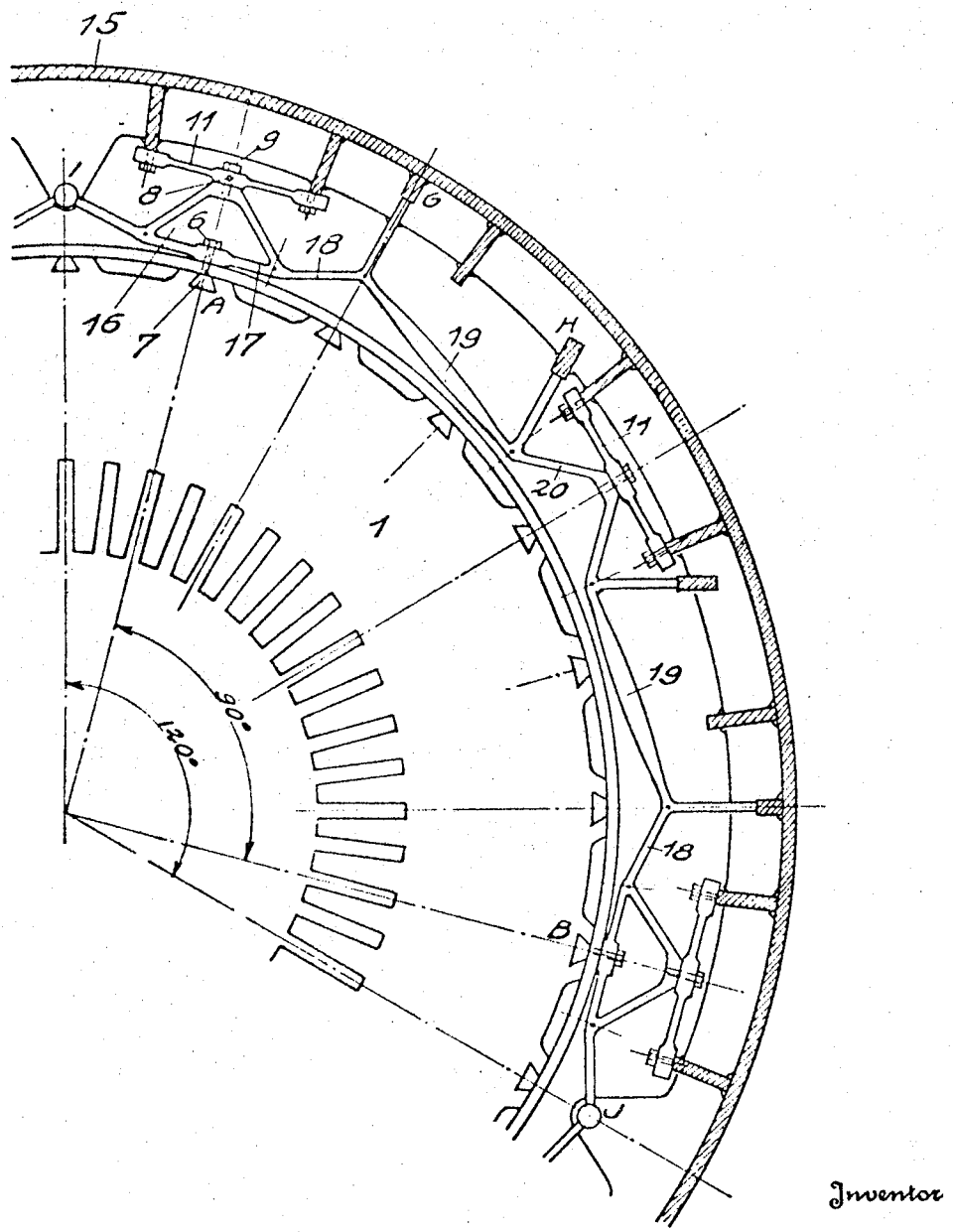

United States Patent Office 3,462,624
Patented Aug. 19, 1969

3,462,624
ANTIVIBRATION SUSPENSION FOR STATOR OF LARGE TURBOGENERATOR
Georges Darrieus, Houilles, France, assignor to Aktiengesellschaft Brown, Boveri & Cie, Baden, Switzerland, a joint-stock company
Filed Nov. 9, 1966, Ser. No. 593,067
Claims priority, application France, Nov. 19, 1965, 39,029
Int. Cl. H02k 5/24
U.S. Cl. 310—51
3 Claims

ABSTRACT OF THE DISCLOSURE

An antivibration suspension for the magnetic stator ring of a turbogenerator machine which absorbs elastic deformations of the ring attributable to magnetic and magnetostriction forces. The suspension is comprised of a circumferential arrangement of triangular like coupling units spaced around the periphery of the magnetic ring, the bases of the coupling units being secured to the periphery of the magnetic ring and the apices of the triangular coupling units being secured to the outer framework of the machine by means of elastic strips placed perpendicular to radii extending from the geometric center of the magnetic ring.

---

This invention concerns antivibration suspension means for the stators of large turbogenerators.

With large turbogenerators, the magnetic forces produced, concentrated opposite the poles, engender forces which have an influence on the magnetic ring of the stator. The latter is subjected to a deformation which tends to give it an elliptical form rotating at the speed of rotation of the rotor.

The said deformation is one of the principal causes of the occurrence in the magnetic ring of vibrations the frequency of which is double that of the current generated. To the above mentioned vibrations there are added those due to magnetostriction. The forces created by the said vibraitons have a radial and tangential effect.

The said vibrations are particularly in evidence in bipolar machines; they produce a frequency of 100 cycles per second and require a special construction of the stator if their transmission to the framework and to the foundations of the machine is to be avoided.

The known solutions which hitherto have been applied to this problem consist essentially in attenuating the strains thus produced by making use of suspensions with longitudinal elastic strips to which the stator ring is fixed. In certain cases use is also made of springs connected between the stator ring and the framework of the machine and having a damping effect, particularly on the radial forces. All the known solutions represent compromises which are to a greater or lesser extent satisfactory in principle and in practice.

The principal object of the present invention is to achieve an antivibration suspension structure for stators giving a complete solution to the problem by means of an elastic suspension, isostatic in principle, ensuring at one and the same time the centering of the magnetic stator ring and the transmission of the couple, both in normal operation and in the event of a short circuit, without stresses tending to act in any way contrary to the free magnetic deformation of the stator, and without transmission of the vibrations to the framework of the machine and its supports.

The invention consists in an improved antivibration suspension for stators of large turbogenerators, comprising a plurality of coupling units arranged between and inter-connecting the magnetic ring of the stator and the framework of the machine, at least three such units being provided in each transverse plane of mounting of the ring, the units being distributed about the ring on external peripheral circumferences of the ring and being constituted by combinations of suitable geometric forms of articulated arms, the configuration, the attachments to the ring and the suspensions to the framework of the said units being such that, while carrying the stator, fixing its mean positon in space and preventing it from turning, they give full liberty of development to the elastic deformations of the ring due to magnetic forces and to magnetostriction, without transmitting to the framework reciprocating stresses or vibrations.

The invention will be further described with reference to the accompanying drawings, which show exemplary embodiments of the invention and in which:

FIGURE 1 is a theoretical sketch illustrating the principle of the invention;

FIGURE 2 shows a section, perpendicular to the axis, of a liaison unit of the device of the invention with the rods forming an isosceles triangle;

FIGURE 3 shows an axial half-section of an end of the stator;

FIGURE 7 shows an articulated arrangement of the liaison unit joining points of attachment at 90° and extending through 120°.

Figure 6:
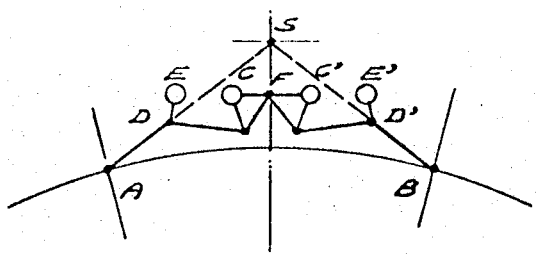
FIGURES 5 and 6 are diagrams of variations of the liaison unit with reduced radial bulk.

The novel solution of the problem of the suspension of the magnetic ring of the stator is based on the fact that, whatever may be the respective deformations due to magnetic field forces in the air gap and magnetostriction, the resulting deformation of the stator ring is such that any point A or B of this ring 1 (FIGURE 1) describes an ellipse about its rest position, with a phase that is a function of its angular position on the ring. The major axis $2a$ of the said ellipse lies along the radius OA (or OB) of the ring, O being the centre of the latter, whereas the minor axis $2b$ is along the tangent to the ring and is equal to half the major axis if the ring is of negligible thickness. The ratio of the minor axis to the major axis is, in general, a function of the ratio of the external diameter $d_e$ to the diameter $d_1$ at the base of the slots 2 of the stator.

It will be seen that if one supports the magnetic ring at a certain number of points, three at least or preferably more, on its external periphery 3 by means of coupling units constituted by arms 4 and each forming an isosceles triangle ABS, the apices S of said triangles, by virtue of their connection to the magnet ring and in spite of the deformation of the latter, experience purely radial reciprocating displacement, with no tangential component, provided that the angle $\beta$ defining the inclination of the rod in relation to the radius (OA or OB) satisfies the relationship:

$$\tan \beta = \frac{a}{b} \tan \alpha$$

where $a$ and $b$ are respectively the dimensions of the major (radial) and minor (tangential) axes of the elliptical contour of the deformation characteristic of the magnetic ring and where $\alpha$ is the angle between the radii OA and OB passing through the connecting points (A and B) of the rods 4 on the external periphery 3 of the ring 1.

Since the displacements of the apex S of the triangle formed by the arms 4 are purely rectilinear, it suffices to connect the various apices S to the framework of the machine by flexible strips disposed perpendicularly to these displacements to prevent any transmission of vibration to the framework. As the radial displacement to which the points S are subjected is of very slight amplitude, of the order of some tens of microns, the flexible strips can extend on both sides of these fixing points.

FIGURES 2 and 3 show a coupling unit comprising a pair of integral rigid arms 4 forming the two sides of an isosceles triangle, such units being distributed in the desired number, equal to or greater than three, around one or more external peripheral circles of the magnetic ring 1 of the stator, preferably in the vicinity of each axial end of the ring. The free ends of the arms have feet 5 which are fixed by means of screws 6, or by some other method of fixing, onto dovetail bars 7 on which the plates of the magnetic ring are assembled. The apex 8 of the pair of arms 4 is fixed by means of screws 9, or by some other method of fixing, to the medial part 10, which is preferably reinforced by a radially flexible elastic strip 11. Accordingly, the isosceles triangle ASB of FIGURE 1 is found again. The ends 12 of the strip 11, which is substantially perpendicular to the radius OS, are firmly fixed by means of screws 13, or by some other method of fixing, to ribs 14 of the external framework 15 of the machine.

Numerous other variations, adapted to a greater or lesser extent to particular requirements of construction or to facilities for manufacture and for mounting can be envisaged, some examples of which are described below.

In particular, the triangle ASB can have forms other than the isosceles. Accordingly, in the example of FIGURE 4, an arbitrary direction AS' has been selected for the first arm. There is always one direction, and only one, for the conjugate direction of the hypothetical arm B'S' (from which results the point of intersection S') for which reciprocating displacement component of B', projected on B'S', is in phase with the reciprocating displacement component of A along AS'; with the result that the movement communicated to the point S' is rectilinear and reciprocating, as well as in the same phase as that transmitted by the rod AS'. The apex S' is connected by a flexible rod C'S' to the framework of the machine, the direction C'S' being perpendicular to the resultant rectilinear displacement of the point S'.

In a particular case, the arm B'S' can coincide with the radius $OB_0S$ which divides the angle α of FIGURE 1. The apex S' then coincides with that (S) of FIGURE 1, and is connected to the framework by a rod CS perpendicular to the new resultant displacement of the apex S, which is no longer radial though still rectilinear.

In the two cases no vibration is transmitted at the suspension point C or C' to the framework.

Figure 5:
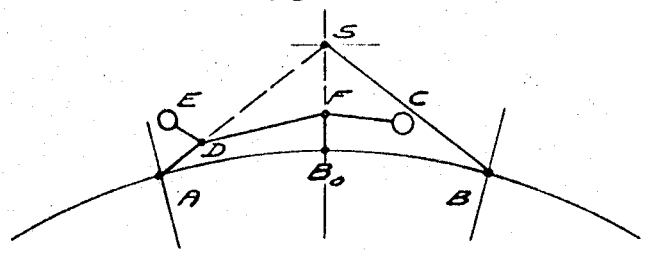

In the example of FIGURE 5, representing reduced radial bulk of the suspension, it is no longer the apex S' (or S) that is connected elastically to the framework, but the point F, nearer radially to the magnetic ring, and a point D located on the line AS, which are connected by flexible rods FC and DE to the framework of the machine. The point F is connected to the magnetic ring by a rod FB' (not shown in the figure), the direction of which is a function of that of DF, in order that the displacement of F shall be rectilinear.

Figure 4:
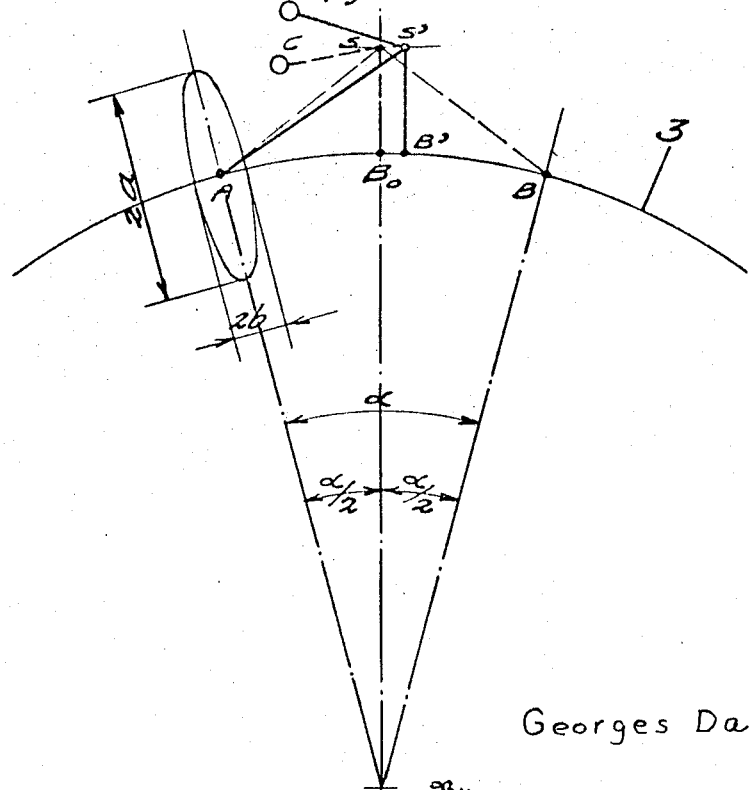
FIGURE 4 shows the diagram of a liaison unit where the rods form any type of triangle.

In a particular case, analogous to that of FIGURE 4 and shown in FIGURE 5, the point F is located on the radius OFS dividing the theoretic angle ASB. The point B' is then located at $B_0$, likewise on the radius OFS.

The direction of each of the rods DE and FC is perpendicular to the resulting displacement of the respective points D and F.

In a symmetrical arrangement shown in FIGURE 6 and derived from the simple solution of FIGURE 2, the tangential force is divided between the two fixing points C and C' on the framework, both connected to the point F. The coupling unit is likewise fixed to the framework by symmetrical rods DE and D'E', perpendicular to the resulting displacements of the respective points D and D'.

The interconnection of pairs of points of attachment such as A and B at 90° to each other, by means of an articulated unit such as that shown in FIGURE 7, lends itself to any tangential displacements of the attachment points of the stator ring, provided they are equal and opposite. This is effectively the case, since these reciprocating displacements of A and B are in phase opposition. By virtue of the principle of apparent work, this leads to equal distribution of the total force between the tangential arms of the arrangement.

In FIGURE 7, an isosceles triangle 16 formed by three arms, has a base 17 fixed tangentially to the stator ring 1 by means of a screw 6 (or by some other method of fixing) with dovetail 7. The apex 8 of the triangle is fixed by means of a screw 9 (or by some other method of fixing) to a flexible strip 11, identical to that of FIGURE 2, fast with the fixed framework 15 of the machine. The ends of the base 17 are furthermore connected to arm systems 18–19 attached at G and at H to the framework 15. At least a pair of rods 20 is attached to an intermediate flexible strip 11 fast with the framework. The ends I and J of the unit, forming an arc of 120°, are connected to the framework 15. It should be understood that for the above triangles other geometric figures could be substituted.

The arrangement of each of such articulated units over a sector of 120° makes it possible to arrange, for each of the fixing planes of the stator ring in the vicinity of its ends, the three equivalent coupling units necessary and adequate for isostatic suspension.

Moreover in this arrangement, in which the suspension arms are tangential to the fixing points on the stator ring, the compensation is exceptionally independent of any relation between the radial and tangential components, which can only be known imperfectly. This compensation accordingly subsists in the more general case where the oscillation, not being sinusoidal any longer, is simply reciprocating or affected by uneven harmonics.

Figure 8:
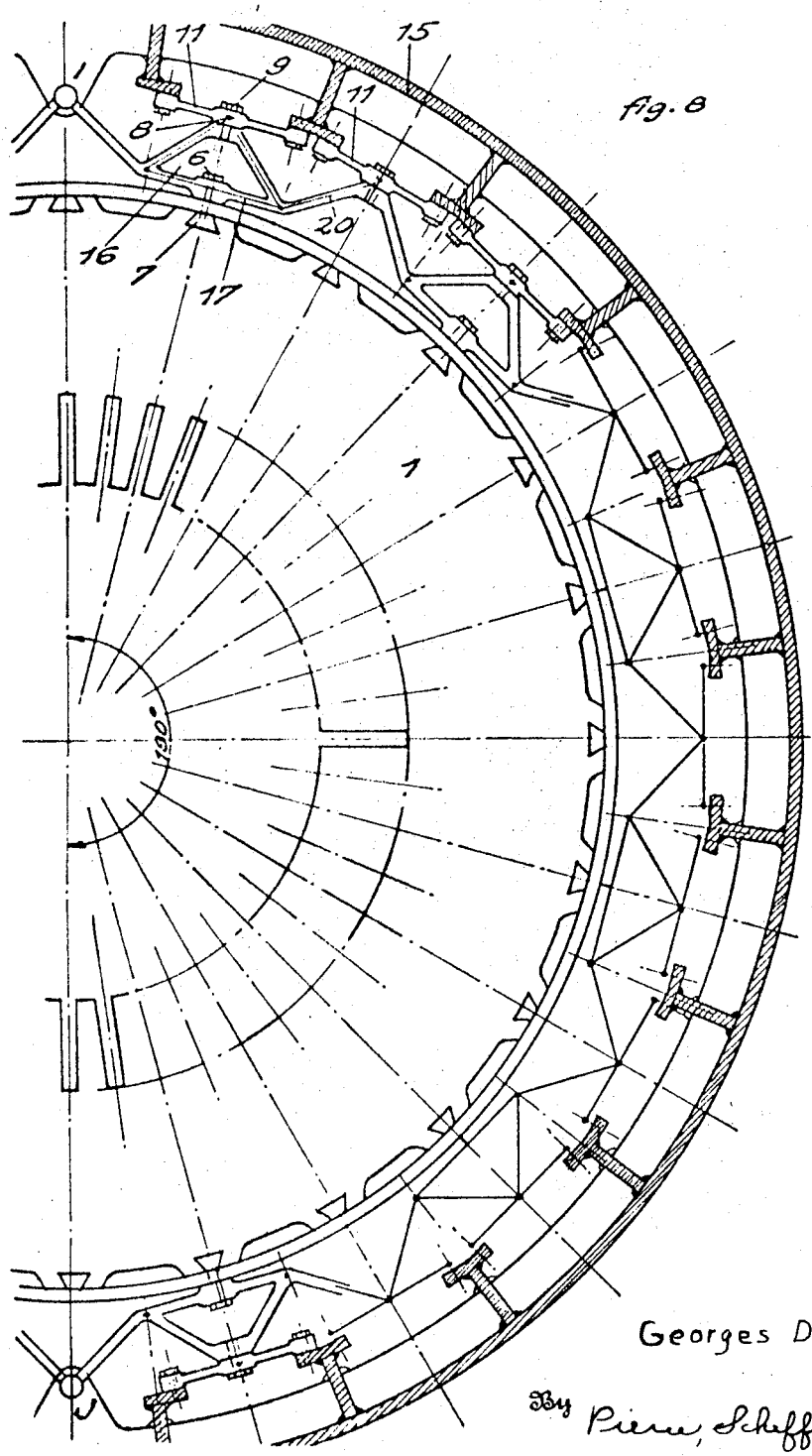
FIGURE 8 is another embodiment of an articulated liaison system extending through 180°.

In another unit, shown diagrammatically in FIGURE 8, a chain is formed by a succession of triangles 16, of each of which the base 17 is connected tangentially to the magnetic ring 1 and the apex 8 to a flexible strip 11 fast with the framework of the machine. The successive triangles 16 are connected together by pairs of rods 20 connected to intermediate strips 11. Each chain extends through 180°, in such a way that the sum of the displacements is zero.

It should be understood that one would not be going beyond the framework of the invention by using combinations of arms other than those of the above examples for which the points of suspension S always effect reciprocating rectilinear displacements, the effect of which is eliminated by the use of flexible strips perpendicular to the said displacements, for forming the connection with fixed framework.

I claim:
1. In an antivibration suspension for stators of large turbogenerator machines, the combination comprising a plurality of coupling units arranged between and interconnecting the magnetic ring of the stator and the framework of the machine, at least three such coupling units being provided in each transverse plane of mounting of the ring, said units being uniformly distributed about the ring on its periphery, each said coupling unit being constituted by two divergent arms connected together at one end to form the apex of a triangle, means respectively securing the opposite ends of said arms to the periphery of said magnetic ring, an elastic strip secured intermediate its ends to said connected together ends of said arms, the longitudinal axis of said strip being disposed perpendicularly to a radius extending from the geometric center of the magnetic ring through the point of interconnection between said arms, and means respectively securing the opposite ends of said elastic strip to the framework of the machine.

2. In an antivibration suspension for stators of large turbogenerator machines, the combination comprising a plurality of coupling units arranged between and interconnecting the magnetic ring of the stator and the framework of the machine, three such coupling units being provided in each transverse plane of mounting of the ring and being distributed 120° apart about the ring on its periphery, each said coupling unit comprising a pair of sets of three arms forming isosceles triangles spaced 90° apart, the base of each triangle being disposed tangentially to the periphery of the magnetic ring and secured thereto intermediate its ends, an elastic strip secured intermediate its ends to the apex of each triangle, the longitudinal axis of said strip being disposed perpendicularly to a radius extending from the geometric center of the magnetic ring through the apex, means respectively securing the opposite ends of said elastic strip to the framework of the machine, an arm system interconnecting one end of each of the bases of said triangles, and means securing said arm system at points intermediate said triangles to the framework of the machine, and arm means securing the opposite end of each of the bases of said triangles to the framework of the machine at points spaced 120° apart.

3. In an antivibration suspension for stators of large turbogenerator machines, the combination comprising a plurality of coupling units arranged between and interconnecting the magnetic ring of the stator and the framework of the machine, two such coupling units being provided in each transverse plane of mounting of the ring and being distributed 180° apart about the ring on its periphery, each said coupling unit comprising a plurality of uniformly circumferentially spaced sets of three arms forming isosceles triangles, the base of each triangle being disposed tangentially to the periphery of the magnetic ring and secured thereto intermediate its ends, an elastic strip secured intermediate its ends to the apex of each triangle, the longitudinal axis of said strip being disposed perpendicularly to a radius extending from the geometric center of the magnetic ring through the apex, means respectively securing the opposite ends of said elastic strip to the framework of the machine, a plurality of pairs of divergent arms connected together at one end and disposed respectively between said trangles, an elastic strip secured intermediate its ends to the connected together ends of each of said arm pairs, the longitudinal axis of said strip being disposed perpendicularly to a radius extending from the geometric center of the magnetic ring through the point of interconnection of said arms of each pair, means respectively securing the opposite ends of said elastic strips to the framework of the machine, and arm means securing the bases of the triangles forming the ends of the two coupling units to the framework of the machine at points spaced 180° apart.

References Cited

UNITED STATES PATENTS

| | | | |
|---|---|---|---|
| 2,320,843 | 6/1943 | Baudry | 310—258 |
| 2,424,299 | 7/1947 | Baudry et al. | 310—258 |
| 2,554,226 | 5/1951 | Taylor | 310—258 |
| 2,561,994 | 7/1951 | Rashevsky et al. | 310—258 |
| 3,293,464 | 12/1966 | Spirk | 310—157 X |

WARREN E. RAY, Primary Examiner

U.S. Cl. X.R.

310—258